U S009316161B2

United States Patent
Surnilla et al.

(10) Patent No.: US 9,316,161 B2
(45) Date of Patent: Apr. 19, 2016

(54) HIGH PRESSURE FUEL PUMPS WITH MECHANICAL PRESSURE REGULATION

(71) Applicant: Ford Global Technologies, LLC, Dearborn, MI (US)

(72) Inventors: Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/243,615

(22) Filed: Apr. 2, 2014

(65) Prior Publication Data

US 2015/0285166 A1  Oct. 8, 2015

(51) Int. Cl.
| | |
|---|---|
| F02B 3/00 | (2006.01) |
| F02D 33/00 | (2006.01) |
| F02D 41/30 | (2006.01) |
| F02D 41/38 | (2006.01) |
| F02M 63/02 | (2006.01) |

(Continued)

(52) U.S. Cl.
CPC .......... F02D 33/003 (2013.01); F02D 19/0605 (2013.01); F02D 19/0628 (2013.01); F02D 19/0684 (2013.01); F02D 19/0689 (2013.01); F02D 19/0692 (2013.01); F02D 19/084 (2013.01); F02D 41/3094 (2013.01); F02D 41/3863 (2013.01); F02M 43/00 (2013.01); F02M 43/02 (2013.01); F02M 63/029 (2013.01); F02M 69/046 (2013.01); F02B 1/12 (2013.01); F02B 3/06 (2013.01); F02B 23/104 (2013.01); F02B 2075/125 (2013.01); F02B 2275/14 (2013.01); F02D 2041/3881 (2013.01); F02D 2200/101 (2013.01); F02D 2250/31 (2013.01)

(58) Field of Classification Search
CPC .. F02B 3/06; F02B 2075/125; F02B 2275/14; F02B 1/12; F02B 23/104
USPC ......................................................... 123/294
See application file for complete search history.

(56) References Cited

U.S. PATENT DOCUMENTS

| | | | |
|---|---|---|---|
| 6,024,064 A | 2/2000 | Kato et al. | |
| 6,138,638 A | 10/2000 | Morikawa | |
| 6,142,747 A | 11/2000 | Rosenau et al. | |
| 6,964,262 B2 | 11/2005 | Hayakawa | |
| 2002/0071768 A1* | 6/2002 | Spoolstra et al. | ............... 417/53 |

(Continued)

FOREIGN PATENT DOCUMENTS

EP  2434137 A1  3/2012

OTHER PUBLICATIONS

Pursifull, Ross D. et al., "Direct Injection Fuel Pump," U.S. Appl. No. 13/830,022, filed Mar. 14, 2013, 50 pages.

Primary Examiner — Lindsay Low
Assistant Examiner — Charles Brauch
(74) Attorney, Agent, or Firm — Julia Voutyras; Alleman Hall McCoy Russell & Tuttle LLP

(57) ABSTRACT

Methods are provided for operating a high pressure fuel pump to maintain one or more selectable, mechanically-regulated pressures. To reduce the cost and complexity associated with a fuel system that involves both port and direct fuel injection, a fuel and pump system is needed that removes complicated electronic control without degrading pump and engine performance. High pressure fuel pumps, associated systems, and methods are provided that involve adding one or more pressure relief valves and solenoid valves in order to maintain one or more discrete, substantially constant pressures of the high pressure fuel pumps and attached direct injection fuel rails.

18 Claims, 6 Drawing Sheets

(51) Int. Cl.
- *F02M 43/00* (2006.01)
- *F02M 43/02* (2006.01)
- *F02M 69/04* (2006.01)
- *F02D 19/06* (2006.01)
- *F02D 19/08* (2006.01)
- *F02B 23/10* (2006.01)
- *F02B 1/12* (2006.01)
- *F02B 75/12* (2006.01)
- *F02B 3/06* (2006.01)

(56) References Cited

U.S. PATENT DOCUMENTS

| | | |
|---|---|---|
| 2002/0170539 A1 | 11/2002 | Rembold et al. |
| 2011/0042520 A1* | 2/2011 | Glaser et al. .............. 244/135 A |
| 2011/0126804 A1* | 6/2011 | Lucas et al. ................... 123/456 |
| 2011/0209687 A1 | 9/2011 | Schroeder et al. |
| 2012/0048242 A1* | 3/2012 | Surnilla et al. ................ 123/497 |
| 2013/0061830 A1 | 3/2013 | Hornby et al. |

\* cited by examiner

HIGH PRESSURE FUEL PUMPS WITH MECHANICAL PRESSURE REGULATION

FIELD

The present application relates generally to high pressure fuel pump systems with mechanically-regulated pressures and methods of operation thereof for use in internal combustion engines.

SUMMARY/BACKGROUND

Some vehicle engine systems utilize both direct in-cylinder fuel injection and port fuel injection. The fuel delivery system may include multiple fuel pumps for providing fuel pressure to the fuel injectors. As one example, a fuel delivery system may include a lower pressure fuel pump (or lift pump) and a higher pressure (or direct injection) fuel pump arranged between the fuel tank and fuel injectors. Engine systems with both port and direct fuel injection are becoming increasingly popular, as the benefits of both injection systems may aid in enhancing engine performance. The high pressure fuel pump may be coupled to the direct injection system upstream of a fuel rail to raise a pressure of the fuel delivered to the engine cylinders through the direct injectors. A solenoid activated inlet check valve, or spill valve, may be coupled upstream of the high pressure pump to regulate fuel flow into the pump compression chamber. The spill valve is commonly electronically controlled by a controller which may be part of the control system for the engine of the vehicle. Furthermore, the controller may also have a sensory input from a sensor, such as an angular position sensor, that allows the controller to command activation of the spill valve in synchronism with a driving cam that powers the high pressure pump.

However, engine systems that utilize both port and direct fuel injection may be more expensive and complicated than either of the individual fuel systems. As direct injection systems require additional components and costly modifications to otherwise port-only injection systems, combining the two fuel systems may be too large of a cost for widespread use. As such, cost reductions of combined port and direct fuel injection systems are needed in order to increase the production of such systems. Since the high pressure fuel pump may be required for direct fuel injection, various approaches have been developed to modify the high pressure pump and related systems in order to simplify and/or reduce the cost of the port and direct fuel injection engines, in particular the direct injection system.

In one approach to reduce cost of direct injection fuel systems, shown by Hornby and Humblot in US 2013/0061830, a high pressure (direct injection) fuel pump is modified to deliver fuel under a single pressure to a fuel rail. This approach includes a mechanical flow control valve and a housing that is coupled to the inlet end of the pump. The flow control valve includes a control plunger that controls the valve opening, selectively trapping fuel to be compressed and sent through a pump outlet or pushing fuel out of a compression chamber of the high pressure pump and into the low pressure inlet side of the pump. Opening and closing of the plunger is actuated by fuel on the outlet side of the pump that is channeled to the control valve via ports. From this, the mechanical flow control valve operates on pressure differences between the outlet and inlet of the pump, thereby replacing the solenoid (electronic) valve by providing fuel at one pressure to the fuel rail.

However, the inventors herein have identified potential issues with the approach of US 2013/0061830. First, the addition of features such as the mechanical control valve and ports for communication between the outlet and a low pressure side volume are modifications to the high pressure pump. As such, for implementation of the single pressure fuel system, if multiple high pressure pumps were tested, then each would need to be retrofitted to reflect the changes as described in US 2013/0061830. Also, changes to the high pressure pump may be more difficult than modifying other features in the fuel system, such as the low and high pressures lines. Furthermore, the modified high pressure pump, as it is described, may only provide a single pressure to the fuel rail coupled to the high pressure pump. The inventors do not provide further explanation for providing more than one pressure to the fuel rail. In common systems as previously mentioned, the solenoid activated inlet check valve may be energized to regulate fuel flow through the high pressure pump. Since the solenoid activated inlet check valve is electronically controlled, a continuously-variable amount of fuel may be provided to the pump compression chamber, and as such, a continuously variable pressure may be provided to the fuel rail, or a large number of discrete pressures. Reducing the possible number of fuel rail pressures from a large number to a single pressure may not be conducive with fuel systems that require more than one fuel rail pressure. Finally, the modified high pressure pump involves a number of components along with the plunger that work in unison in order for the pump to operate as desired. If one of the multiple components, such as the spring, pin, valve blade, and valve disk, were to fail, then the function of the high pressure pump may be altered or disabled entirely.

Thus in one example, the above issues may be at least partially addressed by a method, comprising: during a first high pressure fuel pump operating mode, regulating a first fuel rail pressure via a first pressure relief valve; and during a second high pressure fuel pump operating mode, regulating a second fuel rail pressure via a second pressure relief valve, the second pressure relief valve in parallel with the first pressure relief valve and separated by a solenoid valve to direct fuel backflow to either the first or second pressure relief valve. In this way, mechanical pressure regulation of the high pressure pump may be achieved with the addition of several components external to the high pressure pump. From this, the high pressure pump itself may not need to be modified which could reduce costs associated with retrofitting existing fuel systems. Also, by regulating the two different pressures (such as a high and a low pressure) of the high pressure pump (and fuel rail), the two operating modes may provide a larger range of possible fuel rail pressures more closely aligned with the continuous pressure control of the solenoid activated inlet check valve. Furthermore, since the pressures are regulated via the first and second pressure relief valves, the aforementioned solenoid activated check valve is not necessary and may not be included in the high pressure pump system. Along with the removal of the spill valve, the instructions for controlling the spill valve stored in the controller can be removed, thereby reducing the complexity of the controller. Finally, through mechanical management of fuel pressure via the two pressure relief valves, the overall cost of the fuel system may be reduced, particularly when both port and direct fuel injection are used.

In another example, multiple discrete pressures can be maintained by the high pressure fuel pump instead of only two pressures. By adding additional pressure relief valves and solenoid valves while arranging as discussed below, more than two pressures can be attained by the fuel pump. In this way, fuel systems that require more than two pump pressures and fuel rail pressures in a fuel rail coupled to the direct injectors can be accommodated for. Each of the multiple discrete pressures can be provided by the high pressure pump during certain operating conditions. For example, during engine idling direct injection may not be required, and as such the lower pressure could be provided by the direct injection (high pressure) pump to minimize wear on the various components while still providing lubrication of the pump.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
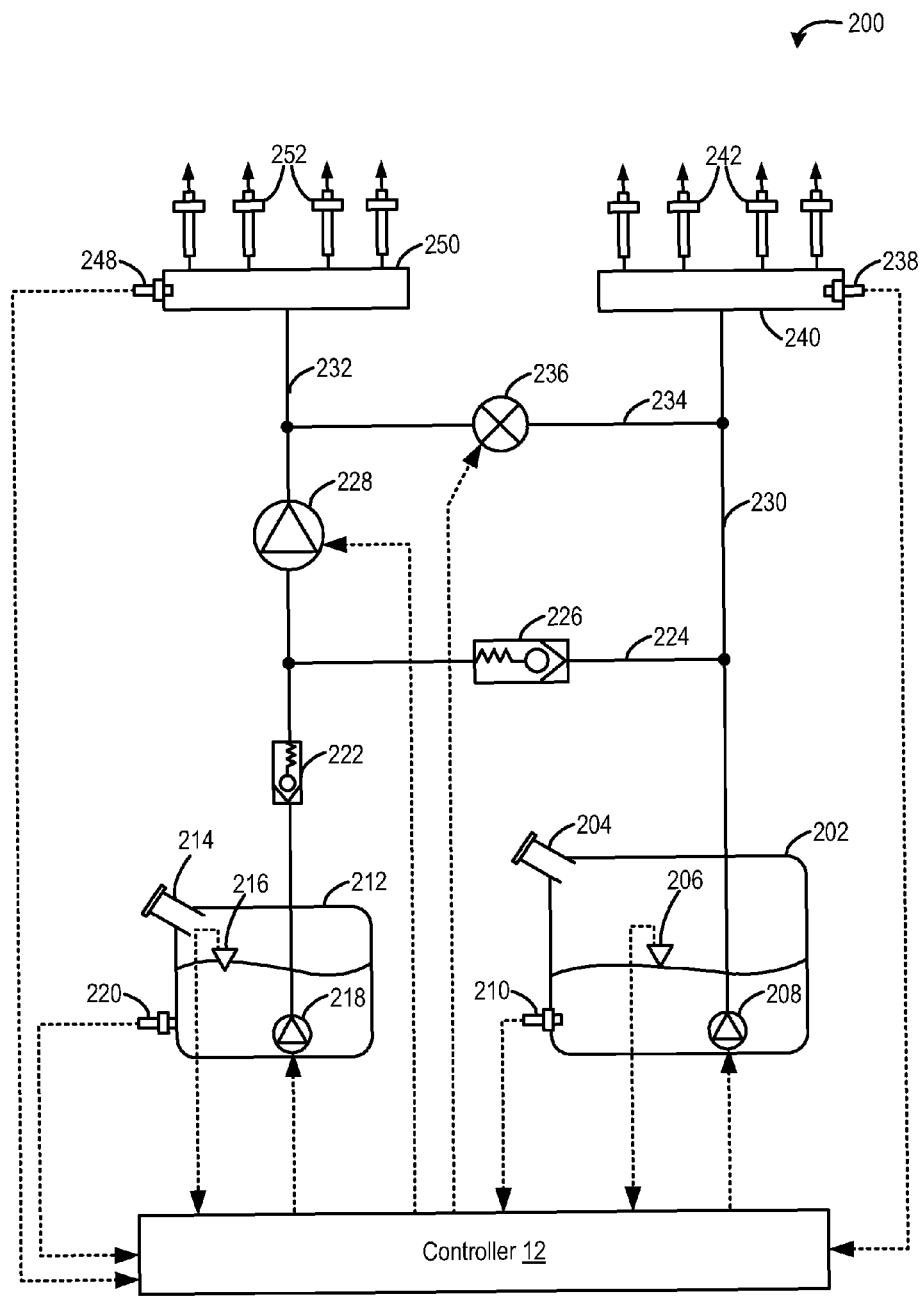
FIG. 2 schematically depicts an example embodiment of a fuel system that may be used with the engine of FIG. 1.
Figure 3:
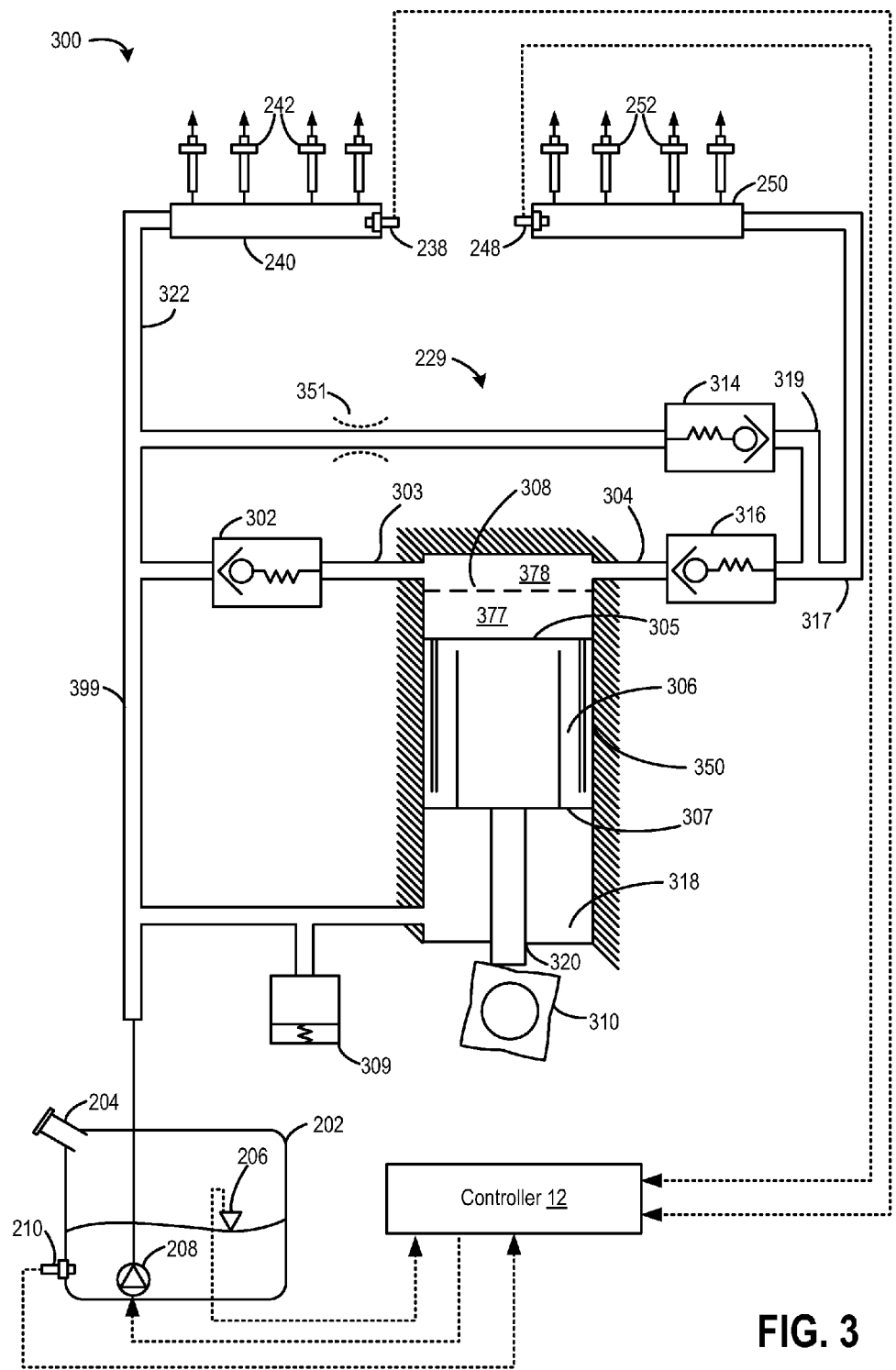
FIGS. 3 and 4 show example embodiments of a high pressure direct injection fuel pump and associated fuel system with a mechanically-regulated pressure.
Figure 4:
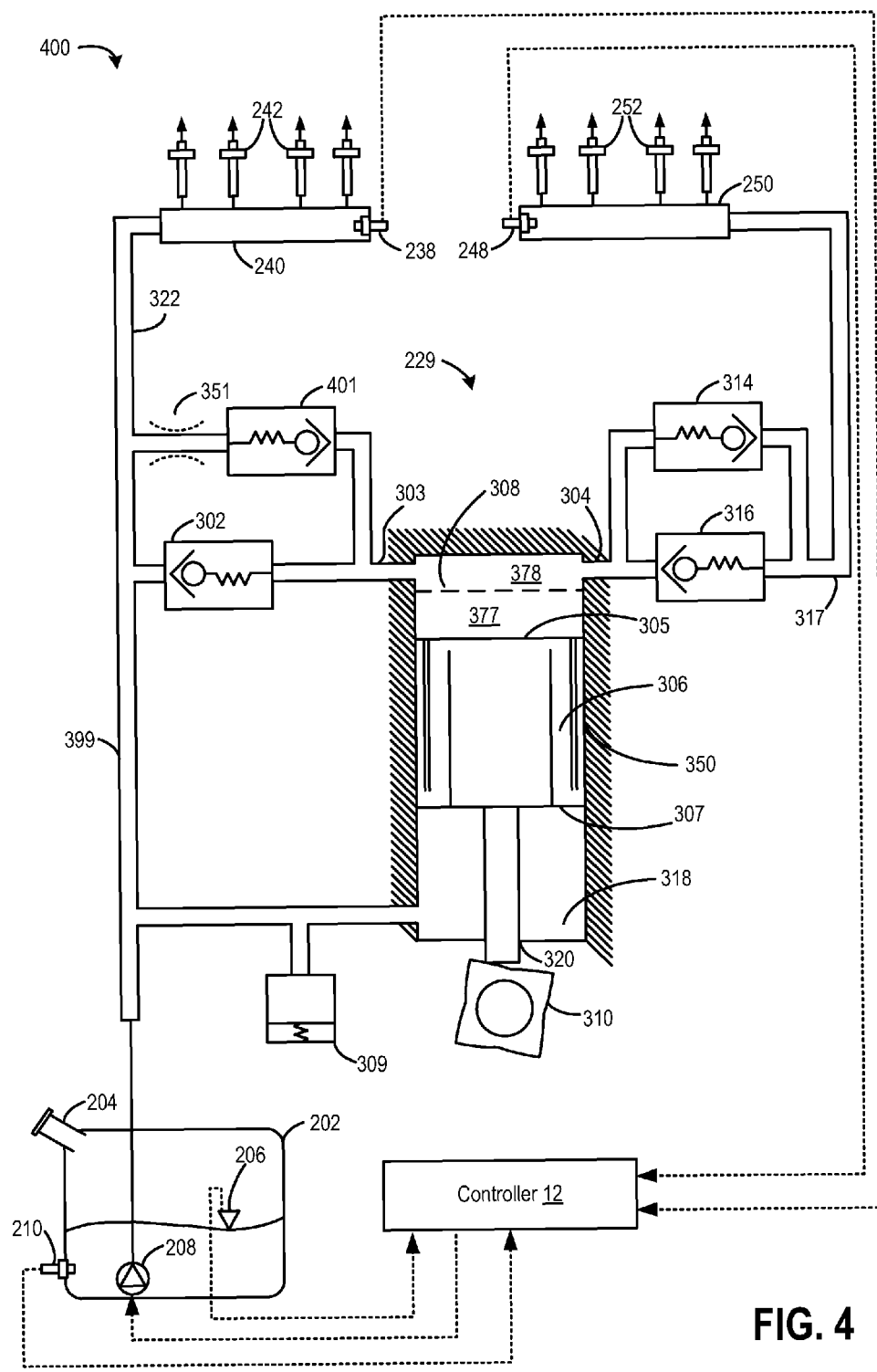

The following detailed description provides information regarding a high pressure fuel pump and the proposed system for mechanically-regulating or more pressures in a fuel rail and compression chamber of the high pressure pump. An example embodiment of a cylinder in an internal combustion engine is given in FIG. 1 while FIG. 2 depicts a fuel system that may be used with the engine of FIG. 1. An example of a high pressure pump with mechanical pressure regulation and related fuel system is shown in detail in FIG. 3 that may be used with the engine of FIG. 1. An alternative embodiment of the high pressure pump of FIG. 3 is shown in FIG. 4 while a high pressure pump with more than one mechanically-regulated pressure is displayed in FIG. 5. Finally, a method for selecting pump operating modes and regulating pressures is shown in FIG. 6 that may be used with the pump of FIG. 5 or similar pump embodiments.

Regarding terminology used throughout this detailed description, a high pressure pump, or direct injection pump, may be abbreviated as a DI or HP pump. Similarly, a low pressure pump, or lift pump, may be abbreviated as a LP pump. Port fuel injection may be abbreviated as PFI while direct injection may be abbreviated as DI. Also, fuel rail pressure, or the value of pressure of fuel within the fuel rail (most often the direct injection fuel rail), may be abbreviated as FRP. Also, as mentioned previously, the solenoid activated inlet check valve for controlling fuel flow into the HP pump may also be referred to as the spill valve. As discussed in more detail below, an HP pump that involves the use of an electronically-controlled valve such as the spill valve may be referred to as an electronically-controlled HP pump, or HP pump with electronically-regulated pressure. In a similar fashion, an HP pump that relies on mechanical pressure regulation without use of an electronically-controlled inlet valve may be referred to as a mechanically-controlled HP pump, or HP pump with mechanically-regulated pressure. Mechanically-controlled HP pumps, while not using electronically-controlled inlet valves for regulating a volume of fuel pumped, may provide one or more discrete pressures based on electronic selection.

Figure 1:
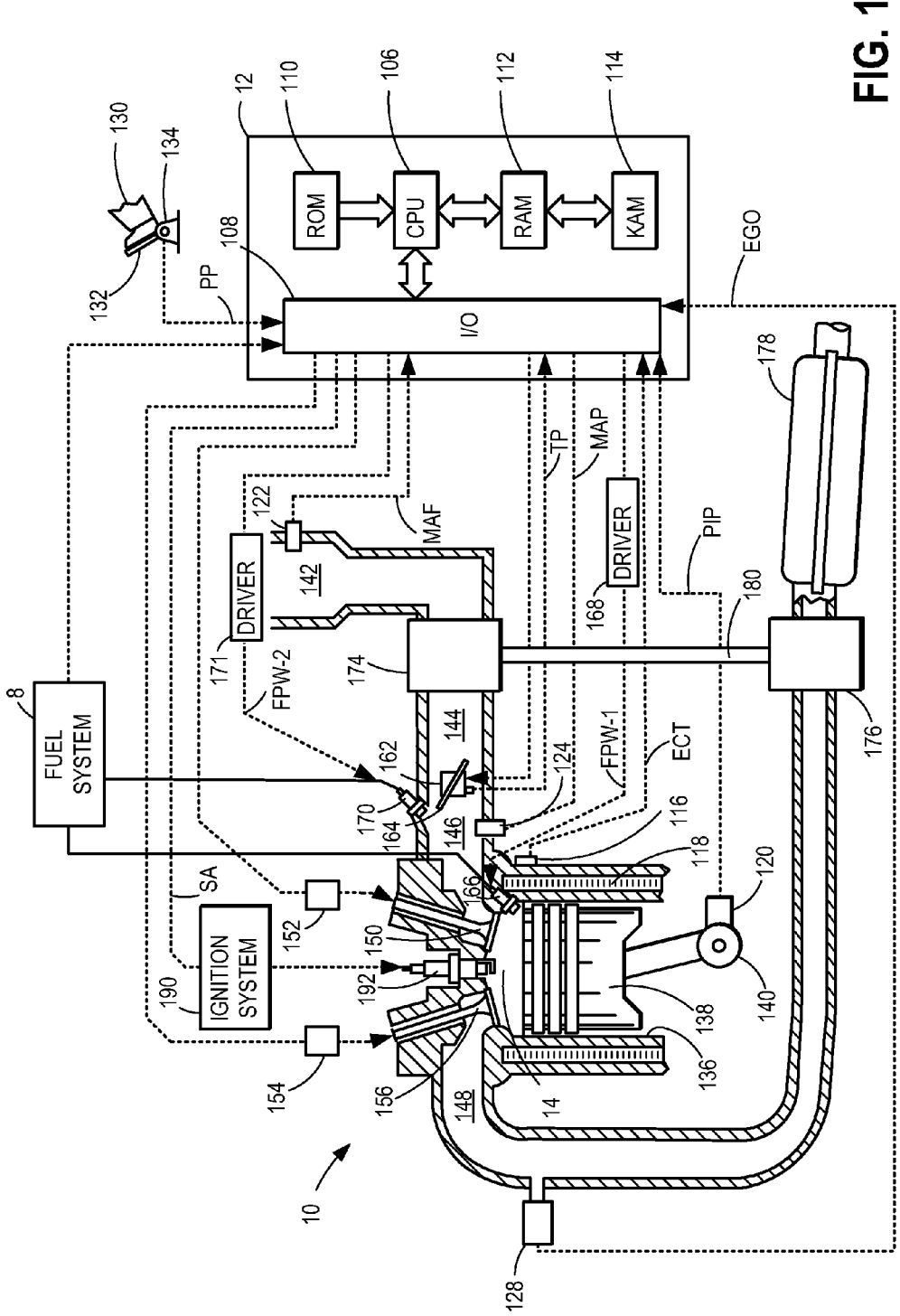
FIG. 1 schematically depicts an example embodiment of a cylinder of an internal combustion engine.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example embodiment 200 of a fuel system, such as fuel system 8 of FIG. 1. Fuel system 200 may be operated to deliver fuel to an engine, such as engine 10 of FIG. 1. Fuel system 200 may be operated by a controller to perform some or all of the operations described with reference to the process flows of FIG. 6.

Fuel system 200 can provide fuel to an engine from one or more different fuel sources. As a non-limiting example, a first fuel tank 202 and a second fuel tank 212 may be provided. While fuel tanks 202 and 212 are described in the context of discrete vessels for storing fuel, it should be appreciated that these fuel tanks may instead be configured as a single fuel tank having separate fuel storage regions that are separated by a wall or other suitable membrane. Further still, in some embodiments, this membrane may be configured to selectively transfer select components of a fuel between the two or more fuel storage regions, thereby enabling a fuel mixture to be at least partially separated by the membrane into a first fuel type at the first fuel storage region and a second fuel type at the second fuel storage region.

In some examples, first fuel tank 202 may store fuel of a first fuel type while second fuel tank 212 may store fuel of a second fuel type, wherein the first and second fuel types are of differing composition. As a non-limiting example, the second fuel type contained in second fuel tank 212 may include a higher concentration of one or more components that provide the second fuel type with a greater relative knock suppressant capability than the first fuel.

By way of example, the first fuel and the second fuel may each include one or more hydrocarbon components, but the second fuel may also include a higher concentration of an alcohol component than the first fuel. Under some conditions, this alcohol component can provide knock suppression to the engine when delivered in a suitable amount relative to the first fuel, and may include any suitable alcohol such as ethanol, methanol, etc. Since alcohol can provide greater knock suppression than some hydrocarbon based fuels, such as gasoline and diesel, due to the increased latent heat of vaporization and charge cooling capacity of the alcohol, a fuel containing a higher concentration of an alcohol component can be selectively used to provide increased resistance to engine knock during select operating conditions.

As another example, the alcohol (e.g. methanol, ethanol) may have water added to it. As such, water reduces the alcohol fuel's flammability giving an increased flexibility in storing the fuel. Additionally, the water content's heat of vaporization enhances the ability of the alcohol fuel to act as a knock suppressant. Further still, the water content can reduce the fuel's overall cost.

As a specific non-limiting example, the first fuel type in the first fuel tank may include gasoline and the second fuel type in the second fuel tank may include ethanol. As another non-limiting example, the first fuel type may include gasoline and the second fuel type may include a mixture of gasoline and ethanol. In still other examples, the first fuel type and the second fuel type may each include gasoline and ethanol, whereby the second fuel type includes a higher concentration of the ethanol component than the first fuel (e.g., E10 as the first fuel type and E85 as the second fuel type). As yet another example, the second fuel type may have a relatively higher octane rating than the first fuel type, thereby making the second fuel a more effective knock suppressant than the first fuel. It should be appreciated that these examples should be considered non-limiting as other suitable fuels may be used that have relatively different knock suppression characteristics. In still other examples, each of the first and second fuel tanks may store the same fuel. While the depicted example illustrates two fuel tanks with two different fuel types, it will be appreciated that in alternate embodiments, only a single fuel tank with a single type of fuel may be present.

Fuel tanks 202 and 212 may differ in their fuel storage capacities. In the depicted example, where second fuel tank 212 stores a fuel with a higher knock suppressant capability, second fuel tank 212 may have a smaller fuel storage capacity than first fuel tank 202. However, it should be appreciated that in alternate embodiments, fuel tanks 202 and 212 may have the same fuel storage capacity.

Fuel may be provided to fuel tanks 202 and 212 via respective fuel filling passages 204 and 214. In one example, where the fuel tanks store different fuel types, fuel filling passages 204 and 214 may include fuel identification markings for identifying the type of fuel that is to be provided to the corresponding fuel tank.

A first low pressure fuel pump (LPP) 208 in communication with first fuel tank 202 may be operated to supply the first type of fuel from the first fuel tank 202 to a first group of port injectors 242, via a first fuel passage 230. In one example, first fuel pump 208 may be an electrically-powered lower pressure fuel pump disposed at least partially within first fuel tank 202. Fuel lifted by first fuel pump 208 may be supplied at a lower pressure into a first fuel rail 240 coupled to one or more fuel injectors of first group of port injectors 242 (herein also referred to as first injector group). While first fuel rail 240 is shown dispensing fuel to four fuel injectors of first injector group 242, it will be appreciated that first fuel rail 240 may dispense fuel to any suitable number of fuel injectors. As one example, first fuel rail 240 may dispense fuel to one fuel injector of first injector group 242 for each cylinder of the engine. Note that in other examples, first fuel passage 230 may provide fuel to the fuel injectors of first injector group 242 via two or more fuel rails. For example, where the engine cylinders are configured in a V-type configuration, two fuel rails may be used to distribute fuel from the first fuel passage to each of the fuel injectors of the first injector group.

Direct injection fuel pump 228 that is included in second fuel passage 232 may be supplied fuel via LPP 208 or LPP 218. In one example, direct injection fuel pump 228 may be an engine-driven, positive-displacement pump. Direct injection fuel pump 228 may be in communication with a group of direct injectors 252 via a second fuel rail 250, and the group of port injectors 242 via a solenoid valve 236. Thus, lower pressure fuel lifted by first fuel pump 208 may be further pressurized by direct injection fuel pump 228 so as to supply higher pressure fuel for direct injection to second fuel rail 250 coupled to one or more direct fuel injectors 252 (herein also referred to as second injector group). In some examples, a fuel filter (not shown) may be disposed upstream of direct injection fuel pump 228 to remove particulates from the fuel. Further, in some examples a fuel pressure accumulator (not shown) may be coupled downstream of the fuel filter, between the low pressure pump and the high pressure pump.

A second low pressure fuel pump 218 in communication with second fuel tank 212 may be operated to supply the second type of fuel from the second fuel tank 202 to the direct injectors 252, via the second fuel passage 232. In this way, second fuel passage 232 fluidly couples each of the first fuel tank and the second fuel tank to the group of direct injectors. In one example, second fuel pump 218 may also be an electrically-powered low pressure fuel pump (LPP), disposed at least partially within second fuel tank 212. Thus, lower pressure fuel lifted by low pressure fuel pump 218 may be further pressurized by higher pressure fuel pump 228 so as to supply higher pressure fuel for direct injection to second fuel rail 250 coupled to one or more direct fuel injectors. In one example, second low pressure fuel pump 218 and direct injection fuel pump 228 can be operated to provide the second fuel type at a higher fuel pressure to second fuel rail 250 than the fuel pressure of the first fuel type that is provided to first fuel rail 240 by first low pressure fuel pump 208.

Fluid communication between first fuel passage 230 and second fuel passage 232 may be achieved through first and second bypass passages 224 and 234. Specifically, first bypass passage 224 may couple first fuel passage 230 to second fuel passage 232 upstream of direct injection fuel pump 228, while second bypass passage 234 may couple first fuel passage 230 to second fuel passage 232 downstream of direct injection fuel pump 228. One or more pressure relief valves may be included in the fuel passages and/or bypass passages to resist or inhibit fuel flow back into the fuel storage tanks. For example, a first pressure relief valve 226 may be provided in first bypass passage 224 to reduce or prevent back flow of fuel from second fuel passage 232 to first fuel passage 230 and first fuel tank 202. A second pressure relief valve 222 may be provided in second fuel passage 232 to reduce or prevent back flow of fuel from the first or second fuel passages into second fuel tank 212. In one example, lower pressure pumps 208 and 218 may have pressure relief valves integrated into the pumps. The integrated pressure relief valves may limit the pressure in the respective lift pump fuel lines. For example, a pressure relief valve integrated in first fuel pump 208 may limit the pressure that would otherwise be generated in first fuel rail 240 if solenoid valve 236 were (intentionally or unintentionally) open and while direct injection fuel pump 228 were pumping.

In some examples, the first and/or second bypass passages may also be used to transfer fuel between fuel tanks 202 and 212. Fuel transfer may be facilitated by the inclusion of additional check valves, pressure relief valves, solenoid valves, and/or pumps in the first or second bypass passage, for example, solenoid valve 236. In still other examples, one of the fuel storage tanks may be arranged at a higher elevation than the other fuel storage tank, whereby fuel may be transferred from the higher fuel storage tank to the lower fuel storage tank via one or more of the bypass passages. In this way, fuel may be transferred between fuel storage tanks by gravity without necessarily requiring a fuel pump to facilitate the fuel transfer.

The various components of fuel system 200 communicate with an engine control system, such as controller 12. For example, controller 12 may receive an indication of operating conditions from various sensors associated with fuel system 200 in addition to the sensors previously described with reference to FIG. 1. The various inputs may include, for example, an indication of an amount of fuel stored in each of fuel storage tanks 202 and 212 via fuel level sensors 206 and 216, respectively. Controller 12 may also receive an indication of fuel composition from one or more fuel composition sensors, in addition to, or as an alternative to, an indication of a fuel composition that is inferred from an exhaust gas sensor (such as sensor 128 of FIG. 1). For example, an indication of fuel composition of fuel stored in fuel storage tanks 202 and 212 may be provided by fuel composition sensors 210 and 220, respectively. Additionally or alternatively, one or more fuel composition sensors may be provided at any suitable location along the fuel passages between the fuel storage tanks and their respective fuel injector groups. For example, fuel composition sensor 238 may be provided at first fuel rail 240 or along first fuel passage 230, and/or fuel composition sensor 248 may be provided at second fuel rail 250 or along second fuel passage 232. As a non-limiting example, the fuel composition sensors can provide controller 12 with an indication of a concentration of a knock suppressing component contained in the fuel or an indication of an octane rating of the fuel. For example, one or more of the fuel composition sensors may provide an indication of an alcohol content of the fuel.

Note that the relative location of the fuel composition sensors within the fuel delivery system can provide different advantages. For example, sensors 238 and 248, arranged at the fuel rails or along the fuel passages coupling the fuel injectors with one or more fuel storage tanks, can provide an indication of a resulting fuel composition where two or more different fuels are combined before being delivered to the engine. In contrast, sensors 210 and 220 may provide an indication of the fuel composition at the fuel storage tanks, which may differ from the composition of the fuel actually delivered to the engine.

Controller 12 can also control the operation of each of fuel pumps 208, 218, and 228 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to each of the low pressure pumps, as required, to adjust the output (e.g. speed) of the respective low pressure pump. The amount of first or second fuel type that is delivered to the group of direct injectors via the direct injection pump may be adjusted by adjusting and coordinating the output of the first or second LPP and the direct injection pump. For example, the lower pressure fuel pump and the higher pressure fuel pump may be operated to maintain a prescribed fuel rail pressure. A fuel rail pressure sensor coupled to the second fuel rail may be configured to provide an estimate of the fuel pressure available at the group of direct injectors. Then, based on a difference between the estimated rail pressure and a desired rail pressure, the pump outputs may be adjusted. In one example, where the high pressure fuel pump is a volumetric displacement fuel pump, the controller may adjust a flow control valve of the high pressure pump to vary the effective pump volume of each pump stroke.

As such, while the direct injection fuel pump is operating, flow of fuel there-though ensures sufficient pump lubrication and cooling. However, during conditions when direct injection fuel pump operation is not requested, such as when no direct injection of fuel is requested, and/or when the fuel level in the second fuel tank 212 is below a threshold (that is, there is not enough knock-suppressing fuel available), the direct injection fuel pump may not be sufficiently lubricated if fuel flow through the pump is discontinued.

In alternate embodiments of fuel system 200 of FIG. 2, second fuel tank 212 and associated second fuel components may be removed such that fuel system 200 is a single fuel system with both port and direct fuel injection. Also, more than two fuels may be utilized in other embodiments. Additionally, in other examples, fuel may be supplied only to direct injectors 252 and port injectors 242 may be omitted. In this example system, low pressure fuel pump 208 supplies fuel to direct injection fuel pump 228 via first fuel passage 230 and first bypass passage 224 while controller 12 adjusts the output of direct injection fuel pump 228 via adjusting a flow control valve of direct injection pump 228. The direct injection pump may stop providing fuel to fuel rail 250 during selected conditions such as during vehicle deceleration or while the vehicle is traveling downhill. Further, during vehicle deceleration or while the vehicle is traveling downhill, one or more direct fuel injectors 252 may be deactivated. Other similar embodiments may be used to provide fuel to either or both of injectors 242 and 252. Also, for clarification to differentiate HP pump 228 from other pumps described hereafter, the HP pump 228 of FIG. 2 is also referred to as an electronically-controlled HP pump or HP pump with electronically-regulated pressure, wherein fuel and/or pressure may be regulated via electronic control as determined by controller 12, as previously described.

Modern vehicles are commonly incorporating fuel systems such as fuel system 200 that utilize both port fuel injection and direct fuel injection, or PFDI engines. These fuel systems often selectively activate the port and direct injectors, or use them in combination to achieve optimum engine performance and fuel efficiency according to the engine demand and other parameters. However, adding and integrating a PFDI system into the fuel system of an engine can greatly increase the overall cost due to the additional components and modifications than is necessary with an engine that utilizes only port or direct fuel injection individually. Methods to reduce the cost of adding a PFDI system may be desired to increase the production and widespread use of vehicles utilizing PFDI systems. The inventors herein have recognized that the high pressure pump of a PFDI system may be modified to decrease cost of the PFDI system without sacrificing performance. As such, the inventors herein have recognized that in order to reduce various costs associated with the systems of port and direct fuel injection in engines that utilize both systems, a high pressure fuel pump with a mechanically-regulated pressure may be used with a fuel system. The proposed HP pump may not require as much complicated computerized control as compared to other HP pumps and fuel systems.

FIG. 3 shows an example embodiment 300 of an HP (DI) pump 229 with a mechanically-regulated pressure. Hereafter, for clarification, pump 229 may also be referred to as a mechanically-controlled HP pump or HP pump with mechanically-regulated pressure. Furthermore, other similar mechanically-operated pumps presented below refer to the presently proposed HP pumps and fuel systems with mechanically-regulated pressure. As seen below, these pumps may be significantly different than the aforementioned electronically-controlled HP pumps.

Inlet 303 of direct injection fuel pump compression chamber 308 is supplied fuel via low pressure fuel pump 208. The fuel may be pressurized upon its passage through direct injection fuel pump 229 and supplied to second fuel rail 250 and direct injectors 252 through pump outlet 304. Second fuel rail 250 may also be referred to as direct injection fuel rail 250. In the depicted example, direct injection pump 229 may be a mechanically-driven displacement pump that includes a pump piston 306 and piston rod 320, a pump compression chamber 308 (herein also referred to as compression chamber), and a step-room 318. A passage that connects step-room 318 to a low pressure fuel line 399 may include an accumulator 309, wherein the passage allows fuel from the step-room to re-enter the low pressure line 399. Assuming that piston 306 is at a bottom dead center (BDC) position in FIG. 3, the pump displacement may be represented as displacement 377. The displacement of the DI pump may be measured as the area swept by piston 306 as it moves from top dead center (TDC) to BDC or vice versa. A second volume also exists within compression chamber 308, the second volume being a clearance volume 378 of the pump. The clearance volume defines the region in compression chamber 308 that remains when piston 306 is at TDC. In other words, the addition of volumes 377 and 378 form compression chamber 308. Piston 306 also includes a top 305 and a bottom 307. The step-room and compression chamber may include cavities positioned on opposing sides of the pump piston. In one example, driving cam 310 may be in contact with pump rod 320 of the DI pump and configured to drive piston 306 from BDC to TDC and vice versa, thereby creating the motion necessary to pump fuel through compression chamber 308. Cam 310 includes four lobes and completes one rotation for every two engine crankshaft rotations.

Low pressure line 399 allows fuel to flow to inlet check valve 302, which is positioned upstream of compression chamber inlet 303. Check valve 302 is biased to prevent fuel flow out of compression chamber 308 and into low pressure line 399 while check valve 302 allows flow from the low pressure fuel pump 208 to enter compression chamber 308. Furthermore, low pressure line 399 may provide low pressure fuel to first fuel rail 240 and port injectors 242 via a fuel rail line 322. First fuel rail 240 may also be referred to as port fuel injection fuel rail 240. Low pressure fuel in lines 399 and 322 may contain fuel at a lower pressure than fuel pumped by HP pump 229 into second fuel rail 250 and direct injectors 252. In this way, within the scope of the present disclosure, fuel may have high and low pressures relative to each other.

Piston 306 reciprocates up and down within compression chamber 308 to pump fuel. Direct fuel injection pump 228 is in a compression stroke when piston 306 is traveling in a direction that reduces the volume of compression chamber 308. Conversely, direct fuel injection pump 228 is in a suction stroke when piston 306 is traveling in a direction that increases the volume of compression chamber 308.

A forward flow outlet check valve 316 may be coupled downstream of an outlet 304 of the compression chamber 308. Outlet check valve 316 opens to allow fuel to flow from the compression chamber outlet 304 into a passage 317 that connects to fuel rail 250 only when a pressure at the outlet of direct injection fuel pump 229 (e.g., a compression chamber outlet pressure) is higher than the fuel rail pressure. A fuel rail pressure relief valve 314 is located in between check valve 316 and fuel rail 250 on a passage 319 that branches off from passage 317. Furthermore, an optional restriction 351 may be positioned in series with pressure relief valve 314, the function of which is described later.

Fuel rail pressure relief valve 314 allows fuel flow out of fuel rail 250 and passage 317 toward the low pressure fuel line when pressure in passages 317 and 319 exceeds a predetermined pressure, where the predetermined pressure may be a relief pressure setting of valve 314. As such, fuel rail pressure relief valve 314 regulates pressure in fuel rail 250 (and passages 317 and 319) to the single pressure relief setting of pressure relief valve 301 (e.g., 15 bar).

Regulating the pressure in fuel rail 250 allows a pressure differential to form from piston top 305 to piston bottom 307. As piston 306 compresses fuel, a higher pressure is present on piston top 305 then at piston bottom 307 which is connected to low pressure line 399. The pressure in step-room 318 is at the pressure of the outlet of the low pressure pump (e.g., 5 bar) while the pressure at piston top is at fuel rail pressure relief valve regulation pressure (e.g., 15 bar). The pressure differential allows fuel to seep from piston top 305 to piston bottom 307 through the clearance between piston 306 and pump cylinder wall 350, thereby lubricating direct injection fuel pump 228.

Thus, during conditions when direct injection fuel pump operation is not requested such as when injectors 252 are not direct injecting fuel into the engine, pressure relief valve 314 regulates pressure in fuel rail 250 (and compression chamber 308) to a single substantially constant (e.g., regulation pressure ±0.5 bar) pressure during most of the compression stroke. On the intake stroke the pressure in compression chamber 308 drops to a pressure near the pressure of the lift pump 208. Lubrication of DI pump 228 may occur when the pressure in compression chamber 308 exceeds the pressure in step-room 318. One result of this regulation method is that the fuel rail is regulated to a minimum pressure approximately the pressure relief of 302. Thus, if valve 302 has a pressure relief setting of 10 bar, the fuel rail pressure becomes 15 bar because this 10 bar adds to the 5 bar of lift pump pressure. Specifically, the fuel pressure in compression chamber 308 is regulated during the compression stroke of direct injection fuel pump 228. Thus, during at least the compression stroke of direct injection fuel pump 228, lubrication is provided to the pump. When direct fuel injection pump enters a suction stroke, fuel pressure in the compression chamber may be reduced while still some level of lubrication may be provided as long as the pressure differential remains. It is noted that the pump system shown in FIG. 3 includes both port and direct fuel injection, with a group of port injectors 242 and a group of direct injectors 252 with their associated fuel rails and fuel composition sensors. DI pump 228 may provide highly-pressurized fuel to direct injector fuel rail 250.

It is noted that while pump 228 is shown in FIG. 2 as a symbol with no detail, the fuel system 300 of FIG. 3 shows pump 229 in full detail. As opposed to mechanically-controlled pumps such as pump 229, electronically-controlled HP pumps such as pump 228 of FIG. 2 may include multiple electric connections via controller 12 to regulate fuel flow through the HP pump. For example, a solenoid activated inlet check valve, or spill valve, may be coupled to the inlet of the HP pump, such as inlet 303 of FIG. 3. Controller 12 may be configured to regulate fuel flow through the valve by energizing or de-energizing the solenoid valve (based on the solenoid valve configuration) in synchronism with driving cam 310. Accordingly, the solenoid activated inlet check valve may be operated in two modes. In a first mode, the solenoid activated check valve may be positioned within an HP pump inlet 303 to limit (e.g. inhibit) the amount of fuel traveling upstream of the spill valve. In comparison, in the second mode, the spill valve is effectively disabled and fuel can freely travel upstream and downstream of the spill valve.

As such, the solenoid activated check valve may be configured to regulate the mass (or volume) of fuel compressed inside the direct injection fuel pump. In one example, controller 12 may adjust a closing timing of the solenoid activated check valve to regulate the mass of fuel compressed. For example, a late inlet solenoid activated check valve closing may reduce the amount of fuel mass ingested into the HP pump. The solenoid activated check valve opening and closing timings may be coordinated with respect to stroke timings of the direct injection fuel pump. As such, the controller may be connected to an angular position sensor that may measure the angular position of cam 310 and record the position readings in order to properly command opening and closing of the spill valve. As explained below, the amount of computing power needed to control the spill valve may be excessive compared to other controller operations.

With electronically-controlled HP pumps, the solenoid activated check valve may be energized to regulate pressure continuously, in that a continuous range of HP pump pressures (and fuel rail pressures) may be available in between a lower threshold and upper threshold pressure that may define minimum and maximum allowable pressures. However, the inventors herein have recognized that a continuous pressure range may not be necessary for maintaining desired performance of the HP pump and fuel system. As such, HP pump 229 of FIG. 3 may regulate a single, substantially constant pressure, and in further embodiments described later, multiple discrete pressures may be reached by the HP pump with or without the ability to maintain a continuously-variable pressure.

Fuel system 300 of FIG. 3 utilizes a DI pump 229 that is not connected to controller 12. As seen in pump 228 of FIG. 2, controller 12 contains wired leads that connect to the pump. As no controller is attached to the DI pump 229, the solenoid activated inlet check valve (spill valve) is also removed. As explained previously, the spill valve is normally included prior to the inlet of the DI pump to regulate the amount of fuel that is ingested into the pump compression chamber 308. Without the spill valve to regulate fuel flow and no electrical connection to controller 12, pump 229 acts as a default pressure pump, in that it provides a single, substantially constant pressure with the use of other components besides the controller and spill valve. In other words, pump 229 functions as a purely mechanically-controlled pump, in that under all conditions it maintains pump strokes according to the movement of driving cam 310 and is not dependent on an external, electrically-activated fuel flow control device, such as a spill valve.

It is noted that although controller 12 is not attached to pump 229 of FIG. 3, controller 12 is still included in fuel system 300 for controlling other operations such as control of lift pump 208 and fuel composition sensors 238 and 248, amongst other function shown in FIG. 2 and previously explained. The difference from the fuel system embodiment shown in FIG. 2 is that controller 12 does not include instructions or connections for operating pump 229 of FIG. 3. That is, pump 229 is not physically or communicatively coupled to controller 12. Inlet check valve 302 and outlet check valve 316 are provided in FIG. 3 for preventing backflow of fuel through HP pump 229.

The depicted embodiment not only reduces (e.g., eliminates) a requirement of a physical connection between controller 12 and a spill valve, in addition, the need for an application-specific integrated circuit (ASIC) that may be used by the controller to drive the spill valve is also reduced. This aids in further reducing the overall cost of the PFDI system. Furthermore, in systems that utilize the ASIC, a significant portion of processing (computing) power of controller 12 is dedicated to ensuring the spill valve is synchronously actuated with the engine (via driving cam 310) to a high degree of resolution. Thus, by reducing the ASIC requirement, and the need to maintain the timing between the spill valve and engine speed, the processor loading of controller 12 may be reduced. It will be appreciated that in alternate embodiments, the ASIC may be included in the controller.

As explained previously, during engine operation, fuel rail pressure relief valve 314 may regulate the fuel rail pressure to remain near a constant value and not to exceed an upper pressure threshold as determined by the relief valve. During such operation, a fuel rail pressure sensor located on direct injection fuel rail 250 may be removed. In another example operation mode, a restriction 351 may be placed in series with fuel rail pressure relief valve 314, where the restriction would allow the fuel rail pressure to increase or decrease with increasing or decreasing engine speed. In this situation, ideally the restriction would be calibrated to allow the fuel rail pressure to increase with the square of the engine speed. In this way, as engine speed and therefore pump speed (speed of the pump piston) increases, the same amount of fuel mass may be injected into the engine during a decreasing time window available for direct injecting fuel.

It is noted here that DI pump 229 of FIG. 3 is presented as an illustrative example of one possible configuration for a mechanically-operated DI pump. Components shown in FIG. 3 may be removed and/or changed while additional components not presently shown may be added to pump 228 while still maintaining the ability to deliver high-pressure fuel to a direct injection fuel rail without electronic pressure regulation.

Referring now to FIG. 4, another example embodiment 400 of a fuel system for supplying fuel to engine 10 of FIG. 1 is illustrated. Many devices and/or components in the fuel system of FIG. 4 are the same as devices and/or components shown in FIG. 3. Therefore, for the sake of brevity, devices and components of the fuel system of FIG. 3, and that are included in the fuel system of FIG. 4, are labeled the same and the description of these devices and components is omitted in the description of FIG. 4.

HP pump 229 of FIG. 4 is a mechanically-controlled HP pump similar to the pump shown in FIG. 3. The primary difference is the absence of passage 319 from the fuel system of FIG. 3. As seen in FIG. 4, rather than directing fuel back into low pressure line 399, fuel rail pressure relief valve 314 may direct fuel back into compression chamber 308, upstream of outlet check valve 316. To maintain substantially the same function as the HP pump of FIG. 3, a compression chamber pressure relief valve 401 is positioned in series with restriction 315. Furthermore, pressure relief valve 401 is positioned in parallel with inlet check valve 302. As such, pressure relief valve 401 may allow fuel flow out of compression chamber 308 toward low pressure fuel line 399 when pressure in compression chamber 308 is greater than a predetermined pressure (e.g., 10 or 15 bar). In this way, pressure relief valve 401 regulates pressure in compression chamber 308 to the single pressure relief setting of pressure relief valve 401 (e.g., 10 or 15 bar).

Restriction 351 is an optional component of HP pump 229 of FIG. 4, in that the removal of restriction 351 may not adversely affect pump performance. Furthermore, pump 229 would still be a mechanically-controlled pump if restriction 351 were removed. The addition of restriction 351 may be beneficial if FRP is desired to increase with engine speed. For example, in a situation where a maximum HP pump volume rate exceeds a current direct fuel injection rate. In other words, in this situation HP pump 229 is pumping a larger volume of fuel per second than is being injected into the engine. As such, the excess fuel may not enter passage 317 and instead flows out of the pump through pressure relief valve 401 then through restriction 351 and back into line 399. A pressure drop of the excess fuel through valve 401 may be substantially constant and not vary with fuel volume flow rate. Conversely, a pressure drop of the excess fuel through restriction 351 is dependent on the fuel volume flow rate. Some restrictions may involve a pressure drop that is the square of flow rate. In this way, as engine speed increases, fuel flow through restriction 351 may proportionally increase given a constant fuel injection mass, thereby resulting in an increase in FRP with engine speed. Therefore, restriction 351 may be desirable to aid in increasing FRP as engine speed increases. Restriction 351 may be sized according to the specific HP pump and fuel systems.

Summarizing, the pump and fuel systems of FIGS. 3 and 4 enable component reduction benefits to be achieved (as compared to the fuel system of FIG. 2) by reducing the reliance on components such as the spill valve and its related components, controller wiring that connects the spill valve to pump 228, and the ASIC to control spill valve actuation. Furthermore, the embodiment of FIG. 3 reduces the need for a dedicated pressure sensor embedded in the DI fuel rail. In this way, Fuel system 300 of FIG. 3 and fuel system 400 of FIG. 4 (including pump 229) may aid in reducing the cost of fuel systems that involve both port and direct fuel injection.

Figure 5:
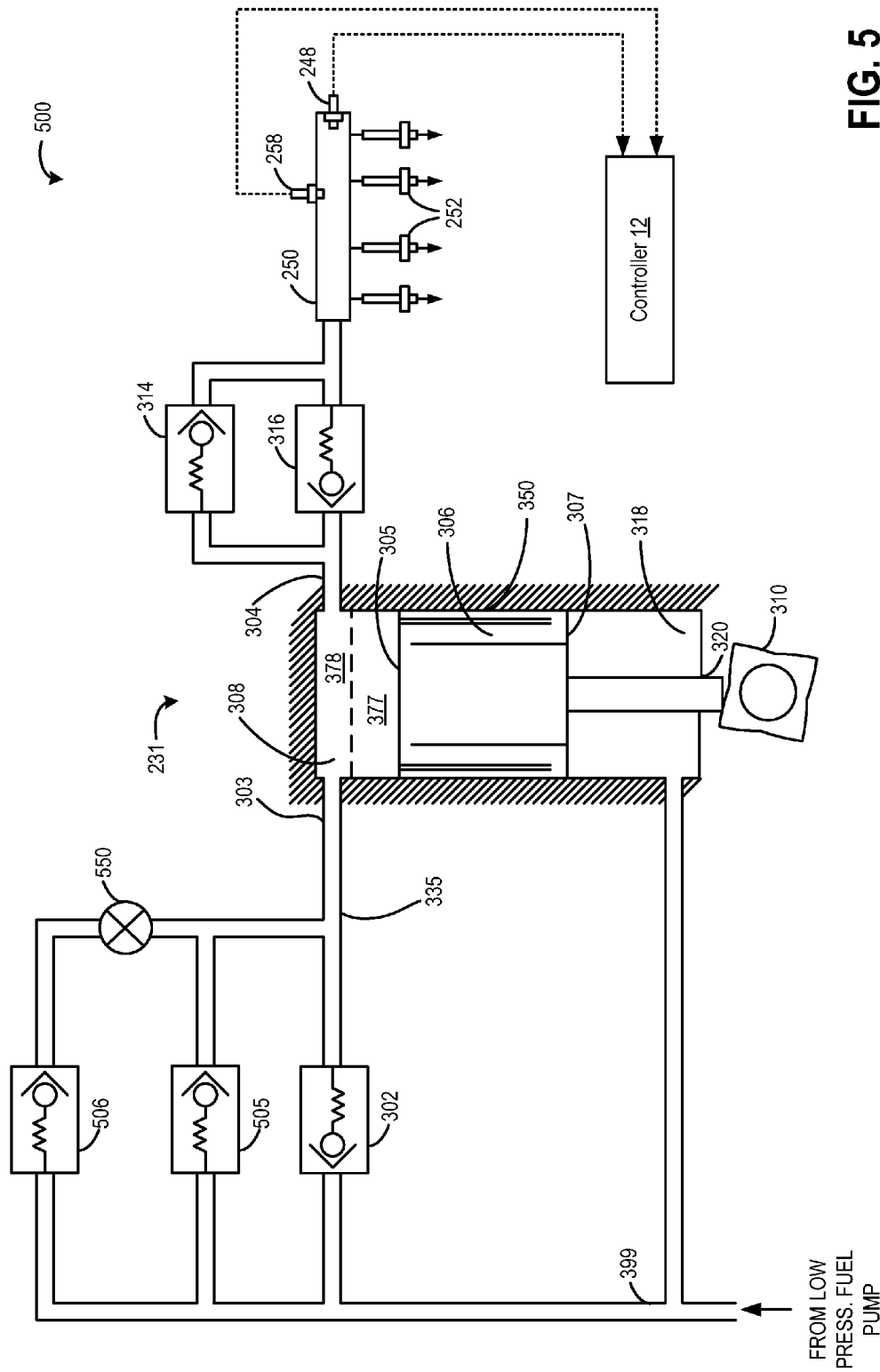
FIG. 5 shows an example of a high pressure direct injection fuel pump and associated fuel system with two selectable, mechanically-regulated pressures.
Figure 6:
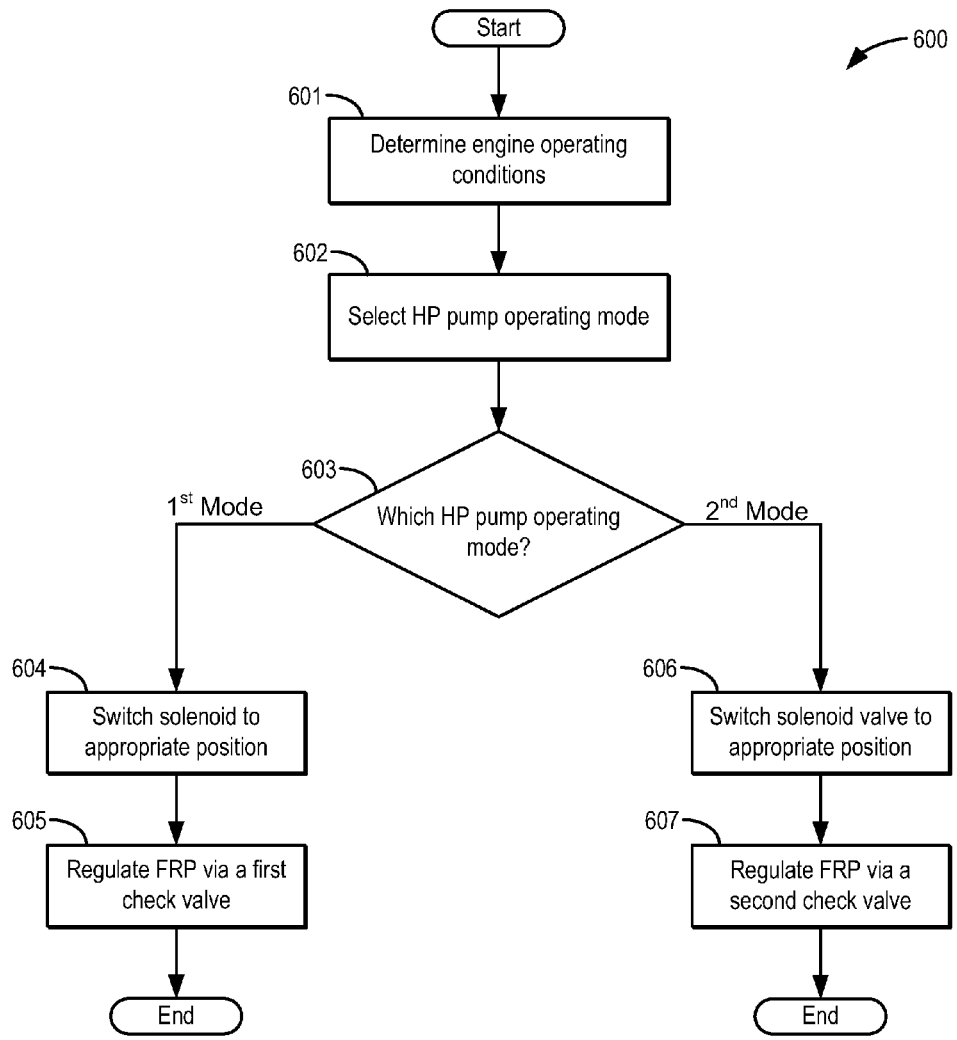
FIG. 6 depicts a flow chart of a method for operating a high pressure pump with multiple mechanically-regulated pressures.

Referring now to FIG. 5, another example embodiment 500 of a fuel system for supplying fuel to engine 10 of FIG. 1 is illustrated. Many devices and/or components in the fuel system of FIG. 5 are the same as devices and/or components shown in FIG. 3. Therefore, for the sake of brevity, devices and components of the fuel system of FIG. 3, and that are included in the fuel system of FIG. 5, are labeled the same and the description of these devices and components is omitted in the description of FIG. 5.

HP pump 231 of FIG. 5 is a mechanically-controlled HP pump similar to the pumps shown in FIGS. 3 and 4. However, rather than mechanically regulating a single substantially constant pressure, HP pump 231 may regulate two different, substantially constant pressures without electrical connection between HP pump 231 and controller 12. Furthermore, as compared to pump 229 of FIGS. 3 and 4, low pressure line 399 may not be directly coupled to first fuel rail 240 (or port injection fuel rail). However, first fuel rail 240 may still be present in the larger fuel system although it is not directly coupled to HP pump 231, as seen in FIG. 5. Also, in addition to fuel composition sensor 248, DI fuel rail 250 may be equipped with a fuel rail pressure sensor 258 for measuring the pressure of the fuel pumped into the fuel rail by DI pump 231. FRP sensor 258 may be used to continuously measure (estimate) and record the FRP of fuel rail 250 in order to monitor the mechanically-regulated pressures of the mechanically-controlled HP pump. It is noted that FRP sensor 258 along with other sensors and/or components may be included or removed while still retaining the general function of DI pump 231 in providing mechanically-regulated pressure to DI fuel rail 250.

The primary components that may enable switching between different pressures are compression chamber pressure relief valves 505 and 506, located in parallel with check valve 302, as well as solenoid valve 550 which is located in between valves 505 and 506. In the present example of FIG. 5, valves 505 and 506 are separated only by solenoid valve 550 upstream of valves 505 and 506. However, in other embodiments, additional components may be placed in between valves 505 and 506 while maintaining the same general function of the HP pump. Furthermore, inlet check valve 302 may be positioned to aid in the mechanically-regulated pressure system of pump 231. As seen in FIG. 5, pressure relief valves 505 and 506 are positioned to prevent forward fuel flow, that is, fuel traveling from low pressure fuel line 399 to pump inlet 303. The forward flow passes through inlet check valve 302 instead. Pressures relief valves 505 and 506 allows fuel flow out of passage 335 (and compression chamber 308) toward the low pressure lines when pressure in passage 335 exceeds the predetermined pressures, where the predetermined pressures may be relief pressure settings of valves 505 and 506. Solenoid valve 550 may be configured to switch backward fuel flow (from passage 335 to low pressure line 399) between valves 505 and 506. The solenoid valve may also be configured to engage one of two positions: open and closed. In an open position, fuel is allowed to flow to valve 506 whereas in a closed position, fuel cannot flow to valve 506. Solenoid valve 550 may be controlled based on a mechanical trigger from the fuel system and pump 231, or in other embodiments may be controlled by controller 12. If solenoid valve 500 is controlled electronically via controller 12, HP pump 231 may still be a mechanically-controlled pump as defined previously since continuously-variable pressure regulated via a solenoid activated inlet check valve is not included in pump 231. As such, simple electronic selection between open and closed positions of solenoid 550 may not involve complicated control algorithms as compared to those required for solenoid activated inlet check valves of electronically-controlled HP pumps.

As an example for operation of HP pump 231, during a first possible operating mode, solenoid valve 550 is closed so fuel may only flow backward through first pressure relief valve 505, which is configured to allow fuel to enter low pressure line 399 upon a first pressure of fuel in passage 335, such as 200 bar. As such, during this mode, pressure in compression chamber 308 and fuel entering fuel rail 250 may reach a maximum pressure of 200 bar determined by the setting of relief valve 505. In this way, FRP relief valve 314 acts as a final regulation feature if relief valve 505 were to malfunction. For example, FRP relief valve may be set to 250 bar, greater than the 200 bar setting of valve 506.

In a second possible operating mode, solenoid valve 550 is open so fuel may flow to second pressure relief valve 506 as well as valve 505. Valves 505 and 506 may be set to allow fuel into low pressure line 399 at different pressures. In particular, valve 505 may be set to 200 bar while valve 506 is set to 22 bar. While valve 550 is in an open position, and upon pressure in line 335 reaching 22 bar, fuel may flow backward into low pressure line 399, thereby regulating HP pump peak compression pressure to 22 bar, which may be approximately the same pressure as is sent into fuel rail 250. It is noted that peak compression pressure may be about 0.7 bar higher than fuel rail pressure in fuel rail 250. The 0.7 bar (or other value) pressure difference may be caused by fuel flow through outlet check valve 316. Ideally, there is no pressure loss through a check valve, but in reality a small decrease in fluid pressure may occur across the check valve. Summarizing, the solenoid valve may direct fuel backflow to either the first or second pressure relief valve. Furthermore, fuel backflow may be directed through the pressure relief valves at mutually exclusive times, such that during the first possible operating mode fuel is only being directed through the first pressure relief valve and during the second possible operating mode fuel is only being directed through the second pressure relief valve. In other words, during a single time period, fuel may flow only through one pressure relief valve and not through both the first and second pressure relief valves simultaneously. The selection between the first and second possible operating modes may be determined by the operating conditions of the engine. It is noted that the first and second pump operating modes are different from each other and in one example, the second operating mode is mutually exclusive with the first operating mode.

It is noted that for proper regulation of pressures in HP pump 231, pressure relief valve 505 may be set to a higher pressure than valve 506, in that more pressure in passage 235 is required to open valve 505 to allow backward fuel flow than the pressure required to open valve 506. If the opposite situation were present, such as valve 505 being set to 22 bar and valve 506 being set to 200 bar, then only the lower, 22 bar pressure would be regulated in pump 331. For example, while valve 550 is closed, the 22 bar pressure would be regulated in passage 335 and the HP pump. While valve 550 is open, the 22 bar pressure would still be regulated since passage 335 is in fluidic communication with both valve 505 and valve 506 while solenoid valve 550 is open. In this way, valve 506 may not function as desired and only one pressure may be regulated if the pressure setting of valve 505 is lower than the pressure setting of valve 506. As such, relief valve 505 may also be referred to as the high pressure relief valve in the desired situation where relief valve 505 is set to a higher pressure than valve 506.

It is noted that while other fuel systems may require fuel rail pressure sensor 258 in order to properly regulate fuel flow and/or pressure, HP pump 231 of FIG. 5 may not require FRP sensor 258. With the present mechanically-regulated HP pump with two selectable pressures as described above, the need for a dedicated pressure sensor, such as FRP sensor 258, may be reduced (e.g., the sensor may be eliminated) to further simplify the fuel system as well as save money. However, FRP may still need to be estimated to quantify the pressure transition between the regulated pressures. This may be accomplished by first knowing the pumped fuel's bulk modulus, or measure of the fuel's resistance to uniform compression. Bulk modulus may be learned on-board the vehicle or alternatively read from a table that presents bulk modulus as a function of variables such as fuel temperature. Also, to estimate FRP the fuel rail volume and injected fuel volume may need to be determined. Fuel rail volume may be a known value depending on the particular DI fuel rail used with the DI pump. Injected fuel volume may be determined (estimated) by other sensors and systems, such as during combustion or during aftertreatment processes to determine air and fuel ratios. With the fuel's bulk modulus, fuel rail volume, and injected fuel volume, the fuel rail pressure may be modeled and estimated as it changes between the two mechanically-regulated pressure values. In this way, FRP sensor 258 may not be included in the fuel system to further reduce cost and complexity of the fuel system.

Furthermore, besides acting as a pressure safeguard, FRP relief valve 314 may have a secondary function. While the DI system is not in use, changes in fuel rail temperatures may alter the FRP such that the FRP may not be able to be estimated in the fashion as described above. In this situation, the secondary function of FRP relief valve 314 may be to aid in estimating FRP. This may be accomplished by setting the FRP relief valve at about 10% to 30% above the higher pressure compression relief valve 505. For example, as mentioned previously, FRP relief valve may be set to 250 bar, greater than the 200 bar setting of valve 506. In this case, FRP relief valve setting is about 25% greater than relief valve 505. By setting FRP relief valve within a known margin above the pressure of relief valve 505, then the possible FRP may be bracketed in between those two pressures.

The mechanically-regulated pressure concept and arrangement shown in FIG. 5 may be expanded to accommodate more than two pressures. If more than two pressures are desired for operation of fuel rail 250 and DI injectors 252, then additional components may be added to the system to expand the mechanically-regulated pressure concept. For example, if three pressures were desired, such as a low, middle, and high pressure respective to each other, then a third compression chamber pressure relief valve would be added in parallel with relief valves 505 and 506. Furthermore, a second, upstream solenoid valve would be added, which may be located in between valve 506 and the third pressure relief valve in a similar fashion as solenoid valve 550 is positioned in between valves 505 and 506. It is noted that as described above, the pressure setting of each additional relief valve may be less than the previous relief valve, so the pressure regulation system operates as desired. In this way, a multi-pressure system may be implemented wherein multiple discrete pressures are maintained by the DI pump and in the DI fuel rail. In alternative embodiments, valve 550 may be controlled synchronous to the angular position of driving cam 310 such that valve 550 may maintain continuously-variable pressure between the pressure settings of valves 505 and 506. The addition of pressure relief valves and solenoid valves, along with other peripheral components not shown in FIG. 5, may contribute to the fuel system while still maintaining the present concept of single or multiple mechanically-regulated pressures of a DI pump.

With the two-pressure system as described with regard to FIG. 5, a favorable failure mode may be present. In this failure mode, the desired default position of solenoid valve 550 may be the closed position, substantially preventing backward fuel flow to pressure relief valve 506. In this way, fuel with the higher pressure according to the pressure setting of valve 505 may be forced to second fuel rail 250 and contribute to high fuel injection pressure of direct injectors 252. This mode may be suitable for engine operation when full or higher power is requested.

FIG. 6 shows a flow chart for an example operation method 600 of a HP pump with dual mechanically-regulated pressures, such as pump 231 of FIG. 5. The process described below will reference components shown in FIG. 5, but it is noted other similar pump and fuel systems may be used without departing from the scope of this disclosure. First, at 601, a number of engine operating conditions may be determined. These may include defining the pressures for a number of pump operating modes, defining the pump operating modes, and estimating engine parameters such as fuel temperature, FRP, engine speed, torque demand, low pressure line fuel pressure, etc. Defining pump operating modes may include selecting what pressures may be used for relief valves 505 and 506 along with the setting of solenoid valve 550. For example, a first HP pump operating mode may include closing solenoid valve 550 and regulating FRP via pressure relief valve 505. Similarly, a second HP pump operating mode may include opening solenoid valve 550 and regulating FRP via pressure relief valve 506. For example, valve 505 may be set at 200 bar while valve 506 may be set at 22 bar, as previously presented. Next, at 602, based on the engine conditions of step 601, one of the two pump operating modes may be selected. For example, if the engine is under high demand such as during an acceleration operation, then the first HP pump operating mode may be selected since it involves a higher FRP. As another example, if the engine is subjected to low speeds, then the second HP pump operating may be selected as it involves a lower FRP.

Next, at 603, the pump operating mode selected in 602 may be determined. If the first pump operating mode is selected, then the process proceeds at step 604. At 604, the solenoid valve 550 may be switched to the appropriate position as determined by the first pump operating mode. For example, in the present case of the first operating mode corresponding to valve 505 (the higher pressure), at 604, valve 550 may be closed to restrict backward flow to valve 505. Finally, at 605, since valve 550 is closed, a pressure of passage 335 and compression chamber 308 (as well as the FRP) may be regulated via a first pressure relief valve (and not the second pressure relief valve used in 607, below). The first pressure relief valve may be valve 505 in this case. Regulating the pressure via the first pressure relief valve includes allowing fuel to flow backward through valve 505 into low pressure line 399 when pressure in passage 335 exceeds the setting of valve 505 (200 bar). In this way, during the first HP pump operating mode, a first FRP, 200 bar, is regulated via a first pressure relief valve, valve 505.

Conversely, at 603, if the second operating mode is selected, then the process proceeds at step 606. At 606, the solenoid valve 550 may be switched to the appropriate position as determined by the second pump operating mode. For example, in the present case of the second operating mode corresponding to valve 506 (the lower pressure), at 606, valve 550 may be opened to allow backward flow to both valves 505 and 506. In this way, switching between the first and second HP pump operating modes includes opening or closing of solenoid valve 550. Finally, at 607, since valve 550 is open, pressure of passage 335 and compression chamber 308 may be regulated via a second pressure relief valve (but not the first pressure relief valve used in 605), the second pressure relief valve being pressure relief valve 506 in this case. Regulating the pressure via the second pressure relief valve includes allowing fuel to flow backward through valve 506 into low pressure line 399 when pressure in passage 335 exceeds the setting of valve 506 (22 bar). Although fuel from passage 335 is allowed to enter valve 505, the fuel may not pass through the valve since its setting is 200 bar, higher than the 22 bar setting of valve 506 which is also in communication with passage 335 while valve 550 is open. Once the fuel reaches a pressure of 22 bar or slightly above, then it may flow into low pressure line 399 via valve 506 and not valve 505. In this way, during the second HP pump operating mode, a second FRP, 22 bar, is regulated via a first pressure relief valve, valve 506.

Engines that utilize both port and direct fuel injection may perform more favorably when the injection systems are selectively operated depending on operating conditions of the engine. For engines with only direct fuel injection, during high power operation of the engine high fuel rail pressure and high pulse width of the direct injectors may be desired. The combination of high FRP and high pulse width may result in a high fuel injection mass that may be required by the high power operation of the engine. In this context, pulse width of the direct injectors is the duration the injectors are open during an injection event. High pulse width may correspond to a higher amount of fuel being delivered to engine cylinders compared to a low pulse width. Conversely, during low power operation of the engine, that is, lower power operation than the aforementioned high power operation, low fuel rail pressure and low pulse width of the direct injectors may be desired. The combination of low FRP and low pulse width may result in a low fuel injection mass that may be required by the low power operation of the engine. In this way, for direct injection engines, the desired fuel injection mass may be provided by the direct injection fuel system, where a HP pump with continuously-variable pressure is desirable to provide a high range of FRP.

With PFDI engines that include both PFI and DI systems as described in the context of the present disclosure, it may be advantageous to operate the PFI system during the low power engine operation and operate the DI system during the high power engine operation. As such, the dynamic range of the PFI and DI systems may be reduced while still providing the desired fuel injection mass. Dynamic range may be the range of fuel rail pressures the PFI and DI systems may be configured to provide. In this way, the HP pump 231 of FIG. 5, with two discrete, mechanically-regulated pressures may provide the desired range of FRP in systems that utilize both PFI and DI systems. As such, cost may be reduced by removing complicated control strategies for continuously-variable, electronically-regulated pressures of HP pumps without sacrificing engine performance. In an alternative example, DI pump 229 of FIG. 3 with a single discrete, mechanically-regulated pressure of the DI system may provide the single pressure during high load engine operation while the LP pump of the PFI system may provide a lower pressure during low load engine operation. Control algorithms may be stored in the controller to command switching between the PFI and DI systems when the engine similarly switches between low and high load operation. In a more general sense, the PFI system may operate during a first engine operating mode, or a low power (load) operating mode. Also, the DI system may operate during a second engine operating mode, or a higher power (load) operating mode. The high and low power modes may be relative to each other, referring to modes where high and low torque and/or speed is desired from the engine, respectively.

As stated previously, to regulate more than two pressures additional pressure relief valves and solenoid valves may be added to the system of FIG. 5. As such, method 600 may be expanded to accommodate the regulation of more than two pressures. With the addition of more than two pressures, each pressure according to a setting of the corresponding relief valve may be included in additional HP pump operating modes. For example, a third operating mode may be defined that corresponds to a third pressure relief valve with a lower pressure than the other two relief valves. An upstream solenoid valve could be positioned to direct fuel backflow to either the second valve (such as valve 506) or the third pressure relief valve. In this case, a third branch would be added to step 603 of method 600 that corresponds to the third HP pump operating mode. In this way, the third pressure relief valve may regulate a third fuel rail pressure. Also, switching between the three HP pump operating modes may include opening or closing of the solenoid valve 550 and the upstream solenoid valve. Similarly, additional branches may be added to step 603 if additional (more than three) discrete pressures are desired.

Put more generally, the method for operating the mechanically-controlled HP pump 231 involves selectively regulating a compression chamber pressure of the HP fuel pump to one or more discrete, substantially constant pressures, the HP fuel pump not including a solenoid activated check valve. Also, the method includes controlling fuel flow while providing no connection between the HP fuel pump 231 and controller 12. Finally, the method involves substantially preventing a pressure increase past an upper pressure threshold by providing fuel rail pressure relief valve 314 in between direct injection fuel rail 250 and HP fuel pump 231.

In this way, by mechanically-regulating pressure in the HP pump, overall cost of the direct injection system and port fuel injection system for PFDI engines may be significantly reduced by reducing the reliance on components such as the spill valve and related controls. For example, one or more of the components and related controls may not be included in the fuel system. Furthermore, during engine idling conditions, the DI pump may produce a lower amount of noise, and incur fewer NVH issues, due to the positioning of the components and the use of dual (or multiple) pressure mechanical regulation. Also, when direct injection is not requested, the HP pump may maintain sufficient lubrication when it maintains one or more mechanically-regulated pressures. By maintaining a low and a high pressure, the same range of desired fuel ail pressures may be accomplished while reducing the need for complicated circuitry and programming associated with the spill valve.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a first high pressure fuel pump operating mode, regulating a first fuel rail pressure via a first pressure relief valve; and
during a second high pressure fuel pump operating mode, regulating a second fuel rail pressure via a second pressure relief valve that is in parallel with the first pressure relief valve and separated by a solenoid valve to direct fuel backflow to the first or second pressure relief valve, wherein a fuel rail pressure sensor is not provided on a direct injection fuel rail fluidly coupled to a high pressure fuel pump.

2. The method of claim 1, wherein switching between the first and second high pressure fuel pump operating modes includes opening or closing of the solenoid valve.

3. The method of claim 1, wherein the high pressure fuel pump is not connected to an external electronic controller.

4. The method of claim 1, further comprising a third pressure relief valve positioned in parallel with the first and second pressure relief valves, the third pressure relief valve configured to regulate a third fuel rail pressure during a third high pressure fuel pump operating mode.

5. The method of claim 4, further comprising an upstream solenoid valve positioned to direct fuel backflow to either the second or third pressure relief valve.

6. The method of claim 5, wherein switching between the first, second, and third high pressure fuel pump operating modes includes opening or closing of the solenoid valve and upstream solenoid valve.

7. The method of claim 6, further comprising a restriction for adjusting fuel rail pressure as an engine speed increases or decreases.

8. A fuel system, comprising:
a port fuel injection system including a port fuel injection fuel rail, the port fuel injection system operating during a first engine operating mode;
a direct injection system including a direct injection fuel rail with no fuel rail pressure sensor, the direct injection system operating during a second engine operating mode;
a high pressure fuel pump fluidly coupled to the direct injection fuel rail, the high pressure fuel pump including no electrical connection to a controller;
an inlet check valve located upstream of the high pressure fuel pump;
a first pressure relief valve in parallel with the inlet check valve;
a second pressure relief valve in parallel with the first pressure relief valve; and
a solenoid valve configured to switch fuel backflow between the first and second pressure relief valves.

9. The fuel system of claim 8, wherein the first engine operating mode is a low power operating mode and the second engine operating mode is a high power operating mode.

10. The fuel system of claim 8, further comprising a fuel rail pressure relief valve located in between the direct injection fuel rail and high pressure fuel pump.

11. The fuel system of claim 10, further comprising a restriction in series with the fuel rail pressure relief valve for adjusting direct injection fuel rail pressure as an engine speed increases or decreases.

12. The fuel system of claim 8, wherein the high pressure fuel pump further comprises an outlet check valve located on an outlet of the high pressure fuel pump.

13. The fuel system of claim 8, further comprising a third pressure relief valve positioned in parallel with the first and second pressure relief valves.

14. The fuel system of claim 13, further comprising an upstream solenoid valve configured to switch fuel backflow between the second and third pressure relief valves.

15. A method for mechanical pressure regulation of a high pressure fuel pump, comprising:
selectively regulating a compression chamber pressure of the high pressure fuel pump to one or more discrete, substantially constant pressures, the high pressure fuel pump not including a solenoid activated check valve;
controlling fuel flow while providing no connection between the high pressure fuel pump and a controller; and
preventing a pressure increase past an upper pressure threshold by providing a fuel rail pressure relief valve in between a direct injection fuel rail and the high pressure fuel pump, wherein no fuel rail pressure sensor is positioned on the direct injection fuel rail.

16. The method of claim 15, wherein the high pressure fuel pump includes an inlet check valve located at an inlet of the pump and an outlet check valve located on an outlet of the pump.

17. The method of claim 15, further comprising a restriction in series with the fuel rail pressure relief valve for adjusting fuel rail pressure as an engine speed increases or decreases.

18. The method of claim 15, wherein the controller does not provide a wired connection or control of the high pressure fuel pump.

* * * * *